May 10, 1932. S. A. B. HAMILTON, JR 1,857,955
DIFFERENTIAL FOR MOTOR VEHICLES
Filed Aug. 20, 1931 2 Sheets-Sheet 1
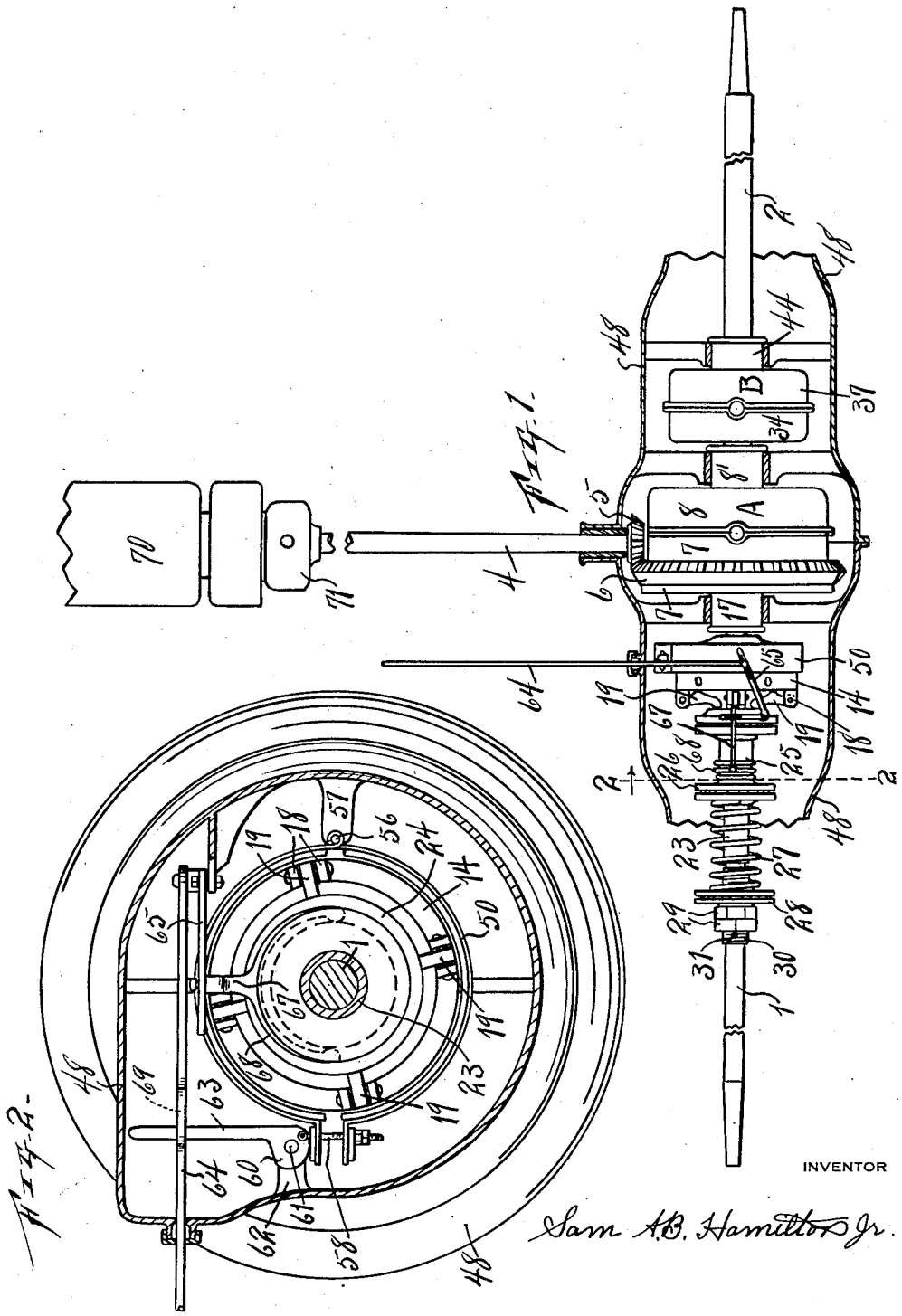
INVENTOR
Sam A.B. Hamilton Jr.

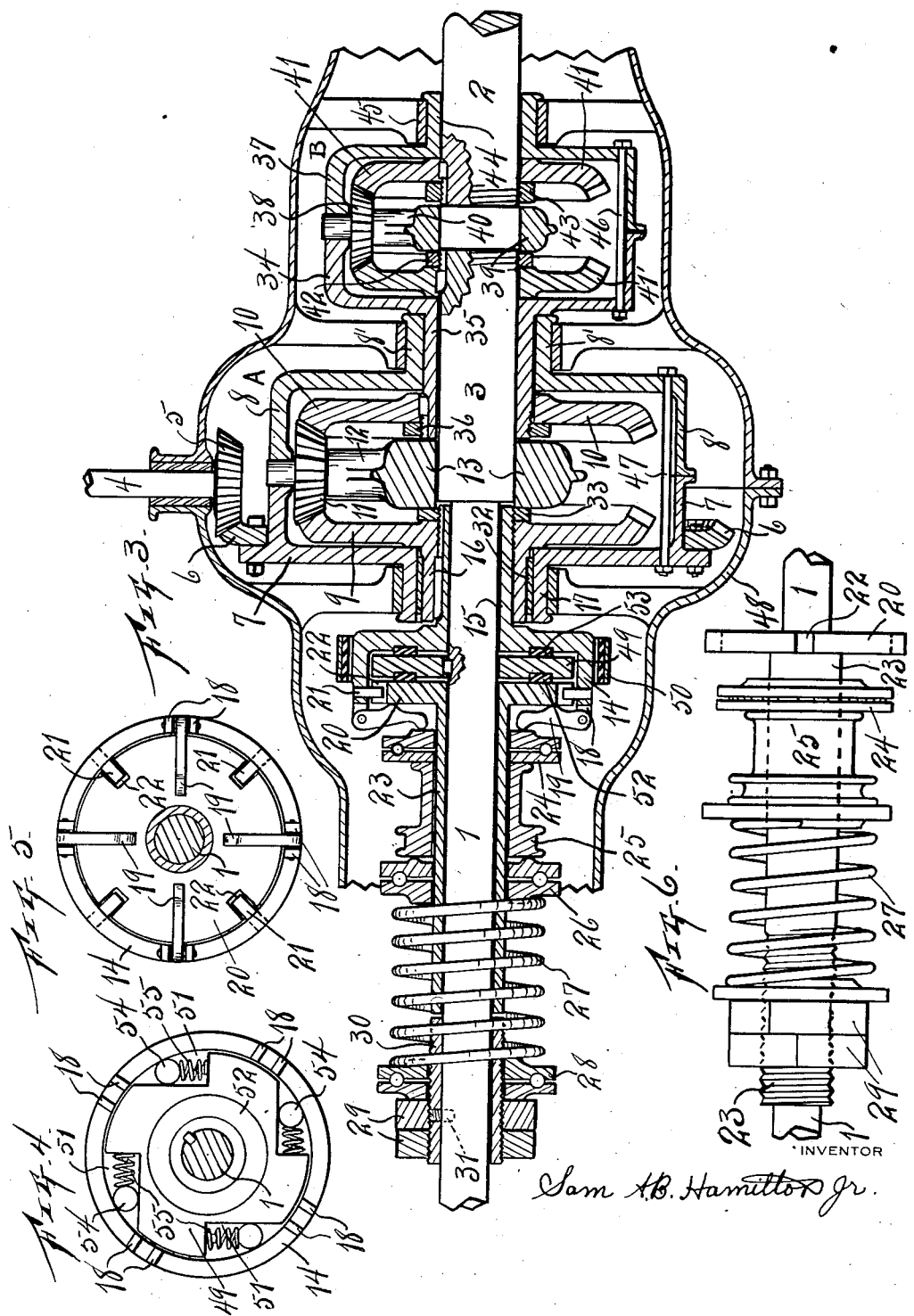

Patented May 10, 1932

1,857,955

UNITED STATES PATENT OFFICE

SAMUEL A. B. HAMILTON, JR., OF FORT WORTH, TEXAS

DIFFERENTIAL FOR MOTOR VEHICLES

Application filed August 20, 1931. Serial No. 558,203.

My invention relates to differentials for motor vehicles and more particularly to a free-wheeling differential; and the object is to provide a differential that may be made in the full floating type. Another object is to provide a differential which may be operated as a two-to-one drive at the will of the driver. An advantage of this device is that the driver of the vehicle has complete control at all speeds of the vehicle. Another advantage is that the driver has two separate and distinct means for changing from the free-wheeling drive to the direct drive in case one of the means should become inoperative from any cause. Another advantage is that provision is made for the driver to throttle his engine down without reducing the speed of his vehicle when on a straight run. Another advantage of this device is that the driver may change to and from, free-wheeling and two-to-one drive at any time without the inter-meshing of gears. Another advantage of this device is that all the gears are constantly in mesh. Other objects and advantages will be fully explained in the following description and the invention will be more particularly pointed out in the claims.

Reference is had to the accompanying drawings which form a part of this application.

Fig. 1 is a side elevation of the device, showing a portion of the housing made in section.

Fig. 2 is a section taken at 2—2 of Fig. 1, showing the control of the free wheeling means and the gear change means.

Fig. 3 is a longitudinal section of the device.

Fig. 4 is a detail view of the free-wheeling mechanism.

Fig. 5 is a detail view of the clutch for operating the same.

Fig. 6 is a view, showing a variation in a portion of Fig. 3.

Similar characters of reference are used to indicate the same parts throughout the several views.

This device consists of a differential in which there is used two complete units of the usual differential gearing and co-operating parts to cause free-wheeling action and change of speed. The differential is provided with the customary axles 1 and 2 which are keyed to the main set of the differential gears 41 and 41' in the usual manner. A free wheeling disk 49 is keyed to the axle 1 and this disk is provided with a housing or drum 14 which is provided with a sleeve 15 which fits over the axle 1 and is revolubly mounted thereon. The sleeve 15 is keyed to the gear 9 of the second unit of the above named differential gear units. This second unit A is preferably positioned on the axle 1 and between the disk 49 and the first named differential gear unit B. The differential gears of the second unit A are provided with the usual casing which consists of the members 7 and 8 in which the pinions 11 are anchored. The casing 7 is provided with a sleeve 17 which is revolubly mounted on the sleeve 16 of the gear 9, and the casing member 8 is provided with a sleeve 8' which is revolubly mounted on the sleeve 35 of one member 34 of the differential gear unit B. The sleeve 35 is keyed to differential gear 10 of the A unit. The casing members 7 and 8 are bolted together by bolts 47.

The free wheeling disk 49 is provided with cut out portions or slots 51 in the outer periphery thereof and wheels or balls 54 are carried in these slots so that they will engage and be driven by the housing or drum 14. A wheel or ball 54 is mounted in each of the slots 51 and made resilient therein by means of springs 55 so as to bear against the inner periphery of the drum 14. One face of the disk 49 is provided with a clutch facing 53 which contacts with the inner face of the drum 14, and the other side of face of the disk is provided with a clutch facing 52. A friction disk 20 is revolubly mounted on the axle 1 and positioned thereon so as to bear against the facing 52. The disk 20 is provided with an elongated sleeve 23 which projects along and fits the axle 1. The drum 14 is provided with cleats 18 which are made rigid with the drum and project axially therefrom for carrying dogs 19. The dogs 19 are pivotally connected to the cleats 18 and swing against the outer face of the friction disk 20. A clutch throw out collar 25 is revolubly mounted on the sleeve 23 of the disk 20 so that it will slide thereon and thrust bearings 24 and 26 are mounted at each end of this collar in the same manner. A threaded collar 30 is placed over the axle 1 and keyed thereto by a key 31 for the support of lock nuts 29. A coil spring 27 is placed over the sleeve 23 of the disk 20 and the collar 30 and positioned between the thrust bearing 28 which is backed or held by the lock nuts 29.

This arrangement allows the lock nuts 29 to be held in a position so as to cause the spring 27 to bear against the clutch throw out collar 25 and its thrust bearings 26 and 24 and the bearing 24 bears against the dogs 19 which holds the disk 20 in contact with the facing 52. This contact position is the normal position of these parts.

The disk 20 is provided with slots 22 in the periphery thereof to receive pins 21 which project downwardly from the rim of the drum 14. These pins 21 and slots 22 cause the disk to revolve with the drum 14 but it is apparent that the disk 20 may also slide axially on the axle 1.

The differential gear casings 7 and 8 may be provided with bearings on the sleeves 17 and 8' respectively and these bearings may be supported by webbing from the differential housing 48. The differential gears 9 and 10 are actuated by pinions 11 which are supported on a spider 13 and the spider 13 is provided with projections 12 for positioning the pinions 11. A ring gear 6 is rigidly mounted on the gear housing 7 and is driven by pinion 5 which is rigidly attached to the drive shaft 4. The drive shaft 4 is driven in the usual manner by a motor 70 through a transmission 71. The gears 9 and 10 are held in position by means of nuts 33 and 36 respectively. The gear 41' of the differential unit B is keyed to the axle 1 and held thereon by a nut 42, and the gear 41 is keyed to the axle 2 and held thereon by a nut 43. The casing 37 may be provided with a bearing 45 for its sleeve 44 and this bearing supported by webbing which is integral with the differential housing 48.

The gears 41 and 41' are driven by pinions 38 which are supported by the casing members 34 and 37 which are bolted together by bolts 46 and the usual form of spider 40.

The drum 14 serves the purpose of a brake drum for the purpose of holding the gear 9 inoperative so that when the ring gear 6 is being driven by the drive shaft 4 the pinions 11 will revolve upon the gear 9. The drum 14 is provided with a brake band 50 which is pivotally mounted on a lug 57 of the housing 48 by means of a pivot 56. This brake is actuated by means of a pull bar 64. The bar or cable 64 is provided with a slot 69 through which an arm 63 projects. The arm 63 is pivotally connected to a lug 62 of the housing 48 by a pin 61, and a brake pull rod 58 is pivotally connected to the arm 63. The arm 63 is provided with a cam form 60 at its pivotal point and so arranged that when the cable or rod is pulled the arm 63 will be caused to swing and the cam 60 will engage one end of the brake band 50 and the pull rod 58 will pull the other end of the band 50, thus causing the band ends to be brought together causing the rake 50 to lock the drum 14.

The clutch throw out collar 25 is provided with a clutch yoke 68 which is pivotally connected to a crank arm 65. The arm 65 is pivotally mounted in the housing 48 and is adapted to be actuated by the pull of the rod or cable 64. The cable 64 may be designated to have three positions, namely, normal position, which is shown in Fig. 1, free wheeling position, and high speed position. The slot 69 in the rod 64 allows the rod or cable to actuate the throw out mechanism before engaging the bar 63, releasing the disk 20 from the free wheeling device 49 allowing free wheeling.

When this is done the differential gearing A is driven which in turn drives the usual differential gearing B which drives the axles 1 and 2 in the usual manner. This is true as long as the engine of the vehicle is pulling the wheels of the vehicle but when the momentum of the car is of such speed that it will overcome the speed of the engine the wheels will be allowed to move free of the engine. The free movement of the wheels in this case is what has been termed in the above description as free-wheeling.

When the bar 64 is moved or pulled to its third position the throw out mechanism is still held out and the slot 69 of the rod or cable 64 is moved to actuate the bar 63 which applies the brake 50 to the drum 14. This position causes the mechanism to actuate to raise the speed of the vehicle or, in other words, causes the engine to drive the wheels of the vehicle twice as fast, with the same revolutions per minute of the engine, as the vehicle was driven in the normal position or the second position.

This raise of the speed of the wheels of the vehicle in relation to the speed of the motor, is caused by the gear 9 of the differential being held inoperative so that the pinions 11 will be forced to revolve around the gear 9 thus imparting this greater speed to the differential gearing B which in turn revolves the axles 1 and 2 at a greater speed than is possible when the gear 9 is allowed to revolve in unison with its cooperating gear 10. When the mechanism is held in this position the free wheeling action is overcome by the locking of the drum 14 and the wheels of the vehicle can not move independent of the engine. It is apparent that any of the three positions may be used at the will of the operator regardless of the speed in which he may be driving.

It is customary in mountainous countries to use the compression of the engine to hold the vehicle when going down an incline. This is done by driving with the rod 64 in normal position which causes the strain to be thrown upon the clutch facings 52 and 53. If for any reason these facings should fail the driver moves the bar 64 to second position which applies the brake 50 to the drum 14 and transfers the strain to these units which will hold the vehicle. This is an added safety feature of this device.

What I claim is—

1. In a differential for motor vehicles comprising differential gears and axles driven thereby; auxiliary differential gears for driving said first named gears, locking means for one of said auxiliay gears for increasing the speed of said axles, means for driving said auxiliary differential gears, and a clutch keyed to one of said axles and cooperating with said gears to permit said axles to revolve faster than said driving means.

2. In a differential for motor vehicles comprising differential gears and axles driven thereby; auxiliary gears for driving said first named gears, a brake drum keyed to one of said auxiliary gears and adapted to be held against rotation to increase the speed of said axles, means for driving said auxiliary gears, and a friction clutch cooperating with said drum for permitting said axles to revolve faster than said driving means.

3. In a differential for motor vehicles comprising differential gears and axles driven thereby; auxiliary gears mounted on one of said axles for driving said first named gears, means for driving said auxiliary gears, a drum keyed to one of said auxiliary gears, a friction clutch keyed to said axle and adapted to engage said drum, means for holding said drum stationary for increasing the speed of said axles, and means for disengaging said clutch for permitting said axles to revolve faster than said driving means.

4. In a differential for motor vehicles comprising differential gears and axles driven thereby; auxiliary differential gears for driving said first named gears, one gear of said auxiliary gears keyed to the casing of said first named gears, the other gear of said auxiliary gear provided with a brake drum keyed thereto, a friction clutch keyed to said shaft and engaging said drum, means for driving said auxiliary differential gears, means for holding said drum against rotation for increasing the speed of said axles, and means for dis-engaging said clutch to allow a freewheeling movement of said axles.

5. In a differential for motor vehicles comprising differential gearing, axles driven thereby and a casing for said gearing, auxiliary differential gears for driving said gearing, one of said auxiliary gears keyed to said casing, the other one of said auxiliary gears keyed to a brake drum, a friction clutch keyed to one of said axles, resilient means for holding said clutch in engagement with said drum, means for driving said auxiliary gears, means for dis-engaging said clutch, and means for holding said drum from rotating.

6. In a differential for motor vehicles comprising differential gears and axles driven thereby; auxiliary differential gears for driving said first named gears, means for driving said auxiliary differential gears, a brake drum keyed to one of said last named gears and cooperating with said gears for increasing the speed of said axles, and a clutch keyed to one of said axles and cooperating with said gears for permitting a free-wheeling movement of said axles.

In testimony whereof, I set my hand this 17 day of August, 1931.

SAMUEL A. B. HAMILTON, Jr.